(12) United States Patent
Boch et al.

(10) Patent No.: US 6,226,525 B1
(45) Date of Patent: May 1, 2001

(54) POWER CONTROL OF LMDS/LMCS BASE STATION TO PROVIDE RAIN FADE COMPENSATION

(75) Inventors: Eric H. Boch, Stittsville; Jung F. Yee, Kanata; John Scott Ployer, Ottawa, all of (CA)

(73) Assignee: Alcatel Networks Corporation (CA)

( * ) Notice: Subject to any disclaimer, the term of this patent is extended or adjusted under 35 U.S.C. 154(b) by 0 days.

(21) Appl. No.: 09/154,449

(22) Filed: Sep. 16, 1998

(51) Int. Cl.$^7$ .................................................. H04Q 7/00
(52) U.S. Cl. ............................ 455/522; 455/69; 455/504
(58) Field of Search .................................. 455/422, 456, 455/425, 446, 561, 563, 564, 69, 70, 522, 504, 505, 424, 9, 13.4, 38.2; 370/346, 338, 449

(56) References Cited

U.S. PATENT DOCUMENTS 5,809,431 * 9/1998 Bustamante et al. ................. 455/562
5,862,171 * 1/1999 Mahany ................................ 375/200
5,886,989 * 3/1999 Evans et al. ......................... 370/347

* cited by examiner

Primary Examiner—Edward F. Urban
Assistant Examiner—Congvan Tran
(74) Attorney, Agent, or Firm—Larson & Taylor, PLC

(57) ABSTRACT

A base station power control for dynamically introducing transmission power to compensate for rain fade in a broadband wireless system operating at millimeter wave frequencies. The base station periodically polls a selected network interface unit at a customer site to obtain status information such as the power level of the received signal. Variations in the power level of the received signal, indicative of variations in the attenuation of the wireless link, are used by the base station power controller to appropriately adjust transmission power. Status information collected by the base station can also include signal to noise level data and the bit error rate.

22 Claims, 10 Drawing Sheets

POWER CONTROL OF LMDS/LMCS BASE STATION TO PROVIDE RAIN FADE COMPENSATION

FIELD OF THE INVENTION

This invention relates to Local Multipoint Delivery/Communication Systems (LMDS/LMCS) operating at millimeter wave frequencies (above 20 GHz) and more particularly to systems and methods for controlling base station transmission power to compensate for time varying attenuation in the wireless link between the base station and network interface units (NIUs) at customer sites.

BACKGROUND

LMDS/LMCS typically utilizes cellular topologies to achieve coverage of a given service area. The cell topology is frequently depicted as a circular area with a centrally deposed base station. Typically the cells are 1–5 km in diameter. Customer sites, having terminals to interface with the base station over a wireless link, are located within the circular area. In a large metropolitan area several similar cells are arranged in a fixed pattern to provide wide area coverage.

As will be discussed later a cellular area may be divided into sectors with the base station employing a sectored antenna to provide separate coverage to each sector. The bandwidth, licensed to the service provider operating the system, is divided into radio frequency (RF) carriers to provide better utilization of the available bandwidth. Generally, network interface units (NIUs) at customer sites are in fixed locations within a cell or sector and communicate with the base station in a point to point protocol utilizing highly directional antennas.

Wireless transmission of millimeter wave frequencies travels over a line of sight (LOS) path and any obstacles within the path will influence communication between the base station and network interface units at the customer site. Similarly, any time-dependent attenuation of radio signals within the path will result in service degradation. Time dependent path attenuation is caused principally by rain within a cell or sector although other weather related conditions can have similar influences. Such other conditions include snow, sleet or hail, and wind blown materials such as dust, sand etc. In the following discussion, time dependent path attenuation is referred to as rain fade but this term is intended to include the other sources of attenuation.

In view of the variable nature of rain fade, both in terms of duration and intensity, it is desirable to provide some type of controllable power compensation to the radio signal. In conventional cellular and Personal Communications Services (PCS) systems base station power control is used to overcome Rayleigh fading and inter-cell interference. In those systems the typical power step is 3 dB and makes no consideration of the mobile terminal's dynamic power control mechanism.

SUMMARY OF THE INVENTION

The present invention addresses the problem of rain fade by way of methods and systems for dynamically adjusting the base station transmission power to compensate for variations in path attenuation.

In one aspect of the invention base station power control is applied to respective radio frequency (RF) carriers of a multi carrier transmission implementation.

Therefore in accordance with a first aspect of the present invention there is provided in a broadband wireless system having a base station for communicating with a network interface unit (NIU) over a wireless link a system for compensating for time variable path attenuation of the link comprising: polling means at the base station to periodically obtain status from the NIU and control means at the base station to adjust transmission power in accordance with the status information.

In a preferred embodiment of this aspect of the invention several NIUs are located within a cellular area and the base station polls status information from a designated reference NIU.

In this aspect of the invention base station power control is based on the nominal power level of the RF signal received at the designated reference NIU.

In accordance with a further aspect of the invention the power level of the RF signal transmitted from the NIU to the base station (uplink) is based on the power level of the signal received by the NIU. In this aspect the nominal uplink power is established in accordance with a long loop power control and a short loop power control adjusts the NIU transmit power level in response to instantaneous changes in receive power.

In accordance with a further aspect of the invention there is provided a method of controlling the power level of the transmission from a base station to a network interface unit over a wireless link in a cellular, broadband wireless communication system in order to compensate for time dependent path attenuation, the method comprising: periodically polling the network interface unit for status information and adjusting transmission power at the base station in accordance with the status information.

In accordance with a preferred embodiment of this aspect of the invention the status information used by the base station to adjust transmission power is the power level of the RF signal received at a designated network interface unit.

In accordance with another aspect of the invention a closed loop downlink (base station to NIU) power control scheme is used in conjunction with uplink (NIU to base station) power control. The uplink power control at the NIU preferably includes a first receive power level sampling interval (long loop) for establishing a nominal power level and a second sampling interval (short loop) for controlling uplink transmit power based on dynamic receive power levels. The first sampling interval is longer than the second to ensure system stability.

BRIEF DESCRIPTION OF THE DRAWING

The invention will now be described in greater detail with reference to the attached drawings wherein.

DETAILED DESCRIPTION OF THE INVENTION

Figure 1:
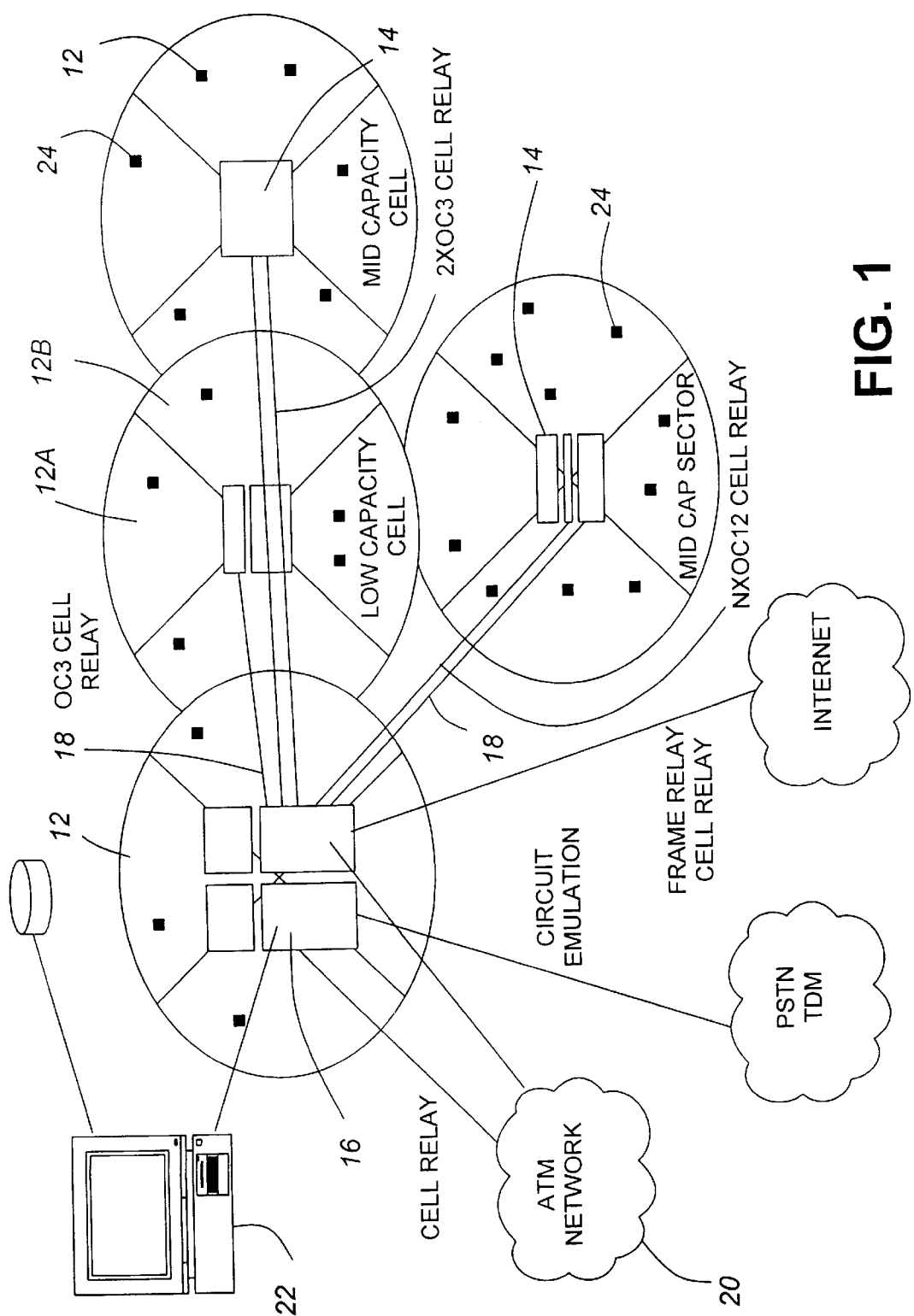
FIG. 1 illustrates a cellular structure for providing wireless service to a large geographic area.

FIG. 1 shows the concept of a metropolitan area covered by an arrangement of cells 12, each having a base station 14. In this implementation auxiliary base stations 14 communicate with a primary base station 16 over intercell links 18. The primary base station 16, in turn, is connected to an ATM network 20, etc. and is controlled by a network manager 22. Fixed customer sites 24 are distributed within each cell and employ highly directive antennas (oriented toward their respective host base station) to establish intracell radio link connectivity.

As shown in FIG. 1, sectorization of the cells (12A, 12B etc.) is employed in order to improve: capacity (since the radio license is largely reused within each sector); operating range (since higher gain base station antennas can be used within narrower sectors); and power control effectiveness (since the sectors can be comparatively sized). A typical cell 12, as shown in FIG. 1, is divided into four sectors although there may be more or fewer sectors in a cell depending on requirements.

When considering operation at low millimeter waves (i.e. 20–50 GHz), the effects of rain on cells, which are typically designed to be 3–5 km in radius, often requires that margins be designed in so as to overcome attenuation due to rain. The use of telecommunication guidelines (i.e. ITU-R) for various geographical rain regions is often employed for this purpose. When considering many regions around the world, it is not uncommon for the rain to affect the propagation losses (in this frequency range) by 15–30 dB. Without downlink power control to reduce the transmit levels during clear weather, the sector transmitter(s) would nominally be overpowered by this amount (15–30 dB). These larger than required power levels cause the cells to appear very large in clear weather and shrink down to their minimum required diameters during inclement weather. The overly large clear weather cells could provide degrading interference (particularly so called "co-channel" interference) which is overcome by frequency planning. This frequency planning process normally results in the allowance of only partial use of the licensed radio spectrum within each call, thereby reducing its communication capacity.

In applying power control to 'stabilize' the size of the cell during all weather conditions, two approaches can be taken; applying downlink power control to all RF carriers in a multi carrier transmission (which Is commonly the practice in cellular and PCS wireless/mobile telephony implementations); or applying power control to each respective RF carrier in a multicarrier transmission. The latter approach is contemplated by the present invention.

Applying downlink power control to each RF carrier within a multicarrier transmission system allows the maintenance of power budgets needed to maintain very specific RF link budgets in order to guarantee specific availability levels to a group of closely co-located customer sites.

Conversely, applying power control to all RF carriers as a group, tends to rectify loss problems associated with small regions (i.e. where the heavy rain cells are located) across all RF carrier frequencies, regardless of their respective needs, thereby potentially aggravating the overall interference problem.

Figure 2:
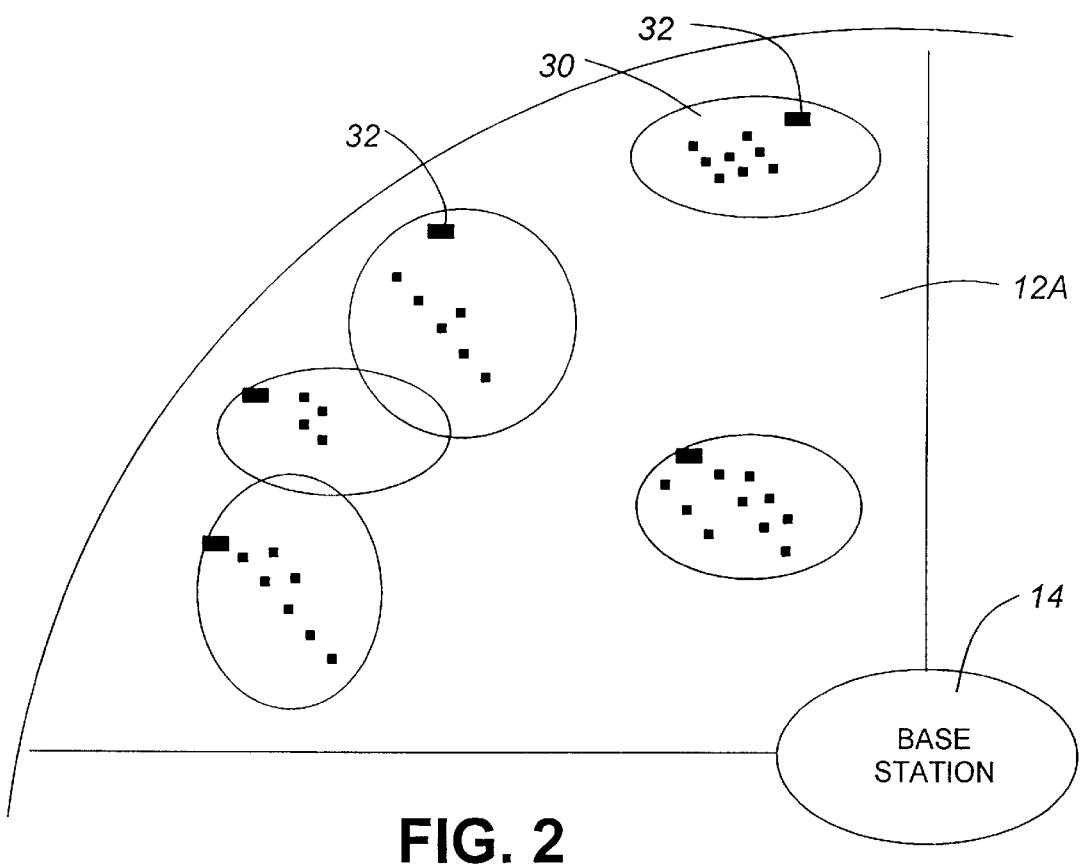
FIG. 2 shows a sectored cell area with customer sited arranged in groups.

In an effort to establish downlink power control which is independently set on each RF carrier within a multicarrier transmission scheme, in one implementation of the present invention, customer sites are grouped such that closely geo-located sites are serviced by one RF carrier. When rain conditions exist within the cell or sector of a cell as shown in FIG. 2, the downlink power control that is applied is then reactive on a per-RF-carrier basis to the needs of only a small group of customers 30 which tend to be more uniformly affected by the rain. In this way the system is able to better provide the appropriate base station sector transmit power for the specific RF carrier as needed by the customers being serviced on that same RF carrier.

Figure 3:
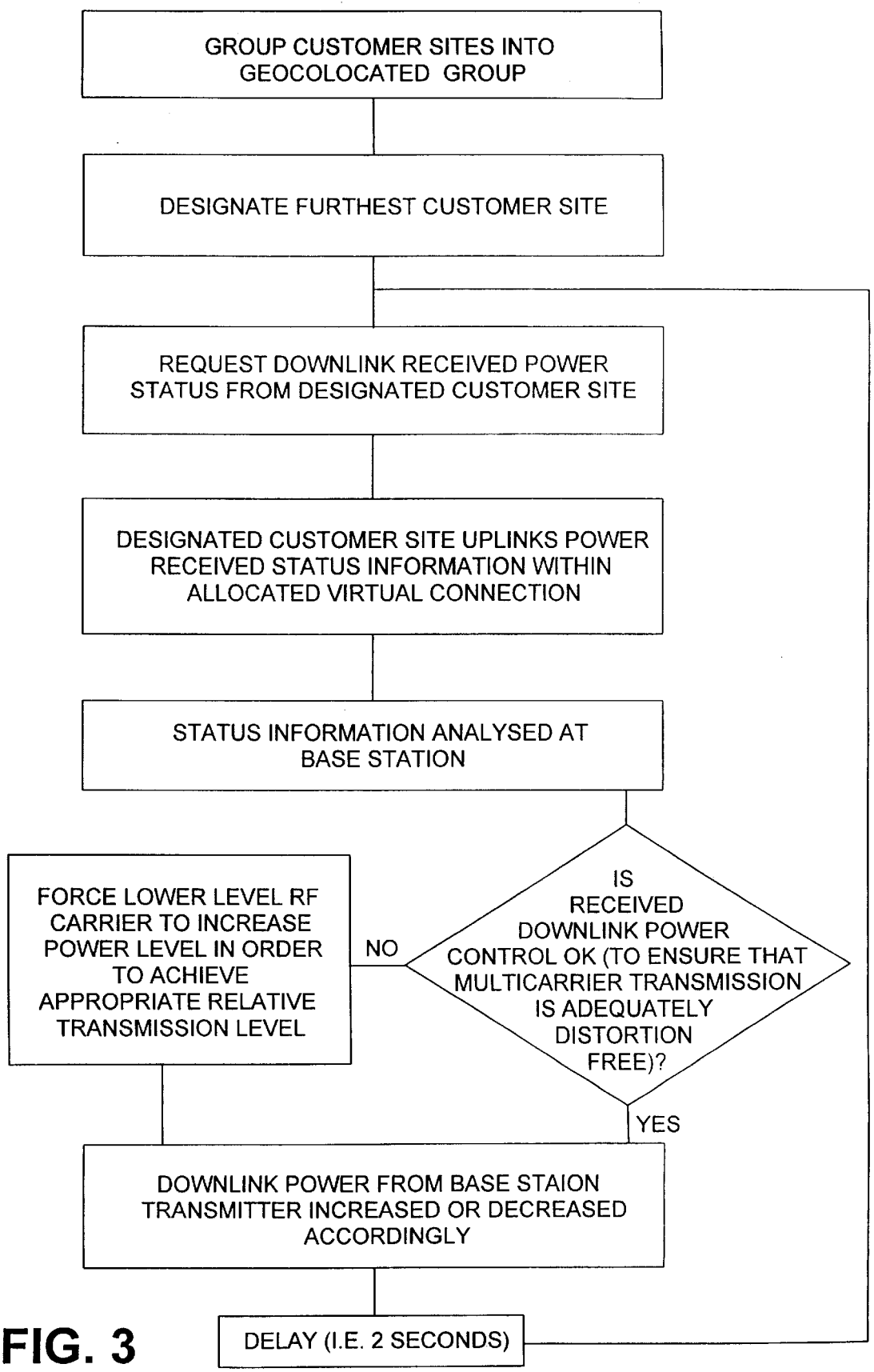
FIG. 3 is a flow diagram of a downlink power control functional algorithm.

Within each of these customer groups 30, one site 32 is selected, generally the furthest site within the group, which is periodically interrogated to establish its received signal power and whether this is satisfactory. This data is requested by the base station and employed to determine its subsequent downlink power level. The top level functional algorithm according to this aspect of the invention is shown in FIG. 3. Since all customer sites are implemented with clear Line-of-Sight (LOS) the closer customer sites within a group inherently achieve their required signal power levels since the power control algorithm employs the furthest site within the group to establish the transmit power requirements.

In the foregoing description the power level adjustment of the RF signal transmitted by the base station is executed on a per-carrier basis or on a group of carriers utilizing closed loop downlink power control. The following description relates to an aspect of the invention in which both downlink (base station to NIU) power control and uplink (NIU to base station) power control are employed.

In a LMDS/LMCS system, the base station typically broadcasts a signal such that a network interface unit (NIU) constituting a customer site receives it at a nominal level and has at least 8 dB Eb/NO where Eb/No is a signal to noise ratio on a per baud or symbol basis. Likewise for the uplink transmission from the NIU to the base station. During rain fade, which as previously indicated may introduce up to 30 dB path attenuation, the base station has to increase its transmit power at a rate that will track the time varying path attenuation and yet not cause uplink dynamic power control capability in an NIU to decrease its output power below the Eb/NO threshold. This implementation of the invention provides the following functionality:

- statistical selection of a reference NIU's, with diversity switching, so that no beacon is required;
- interleaving of downstream power control with upstream power control;
- correlation of downstream transmit power limits to minimize inter-sector and inter-cell interference;
- correction of transmit power for deep, long, fades in the transmission path; and
- ability to trigger the control based on either received power, signal to noise ratio (SNR), or bit error rate (BER).

Base station power control is used to adjust the downlink power output, in response to rain fade. It consists of an algorithm running on an asynchronous transfer mode (ATM) radio interface card (ARIC) at the base station that uses information about downlink power, obtained from the base station media access control (MAC) layer, to either increase or decrease the downlink transmit power.

Figure 4:
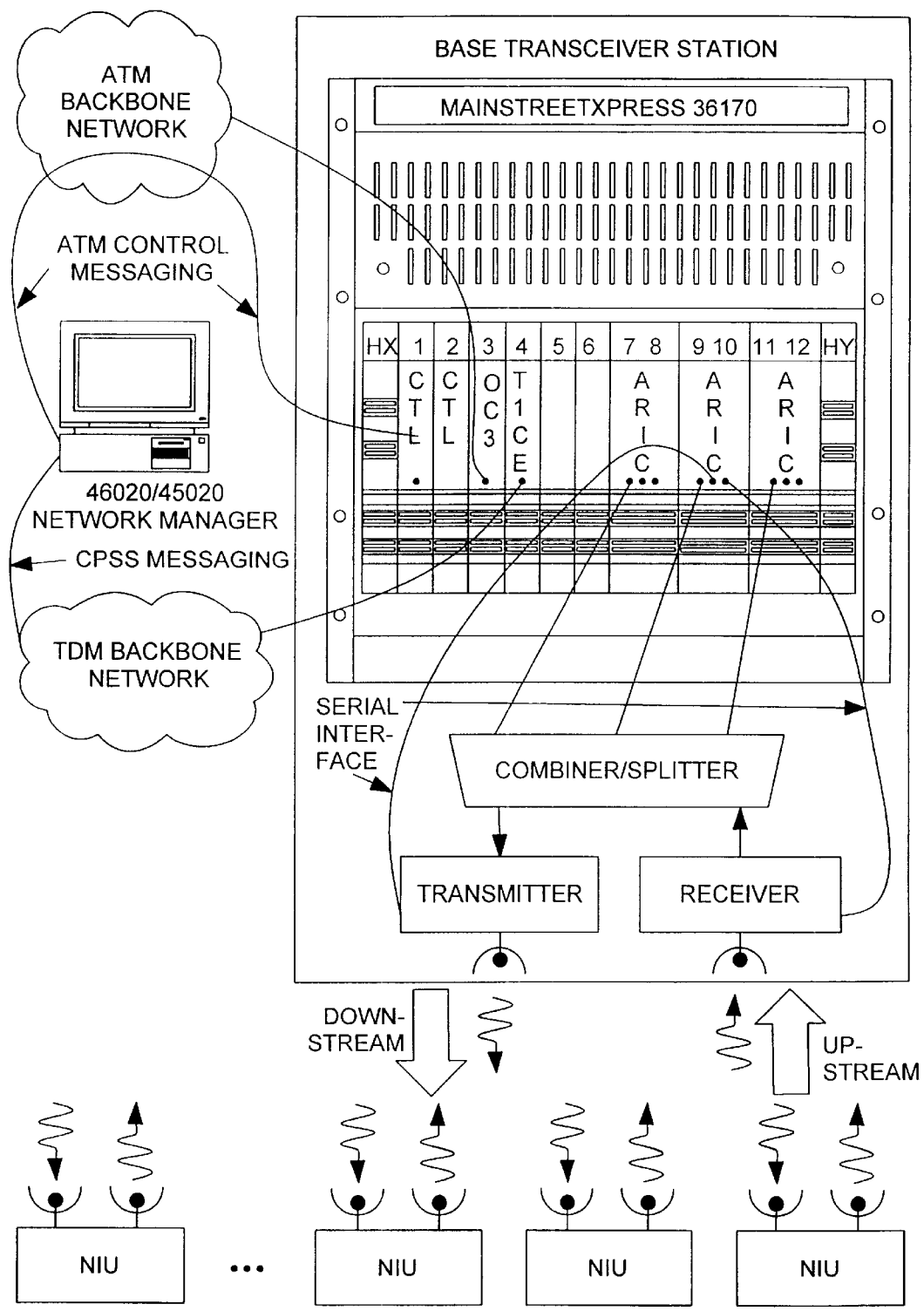
FIG. 4 is a high level illustration of a broadband wireless system.

The present implementation of a broadband wireless system, shown at a high level in FIG. 4, provides a wireless point-to-multipoint connection between a BTS (for example a Newbridge 36170 multi service switch with an ATM radio interface card-ARIC) and NIUs interfacing with customer premise equipment (CPE). This Line-Of-Sight (LOS) propagation may be interrupted by rain, for example, which increases path attenuation. On the CPE side, each NIU contains both a long and short loop power control that adjusts the uplink transmitted power to mitigate against changes in the path loss. Base station Power Control is closed loop power control at the ARIC that performs the same function on the downlink.

Figure 5:
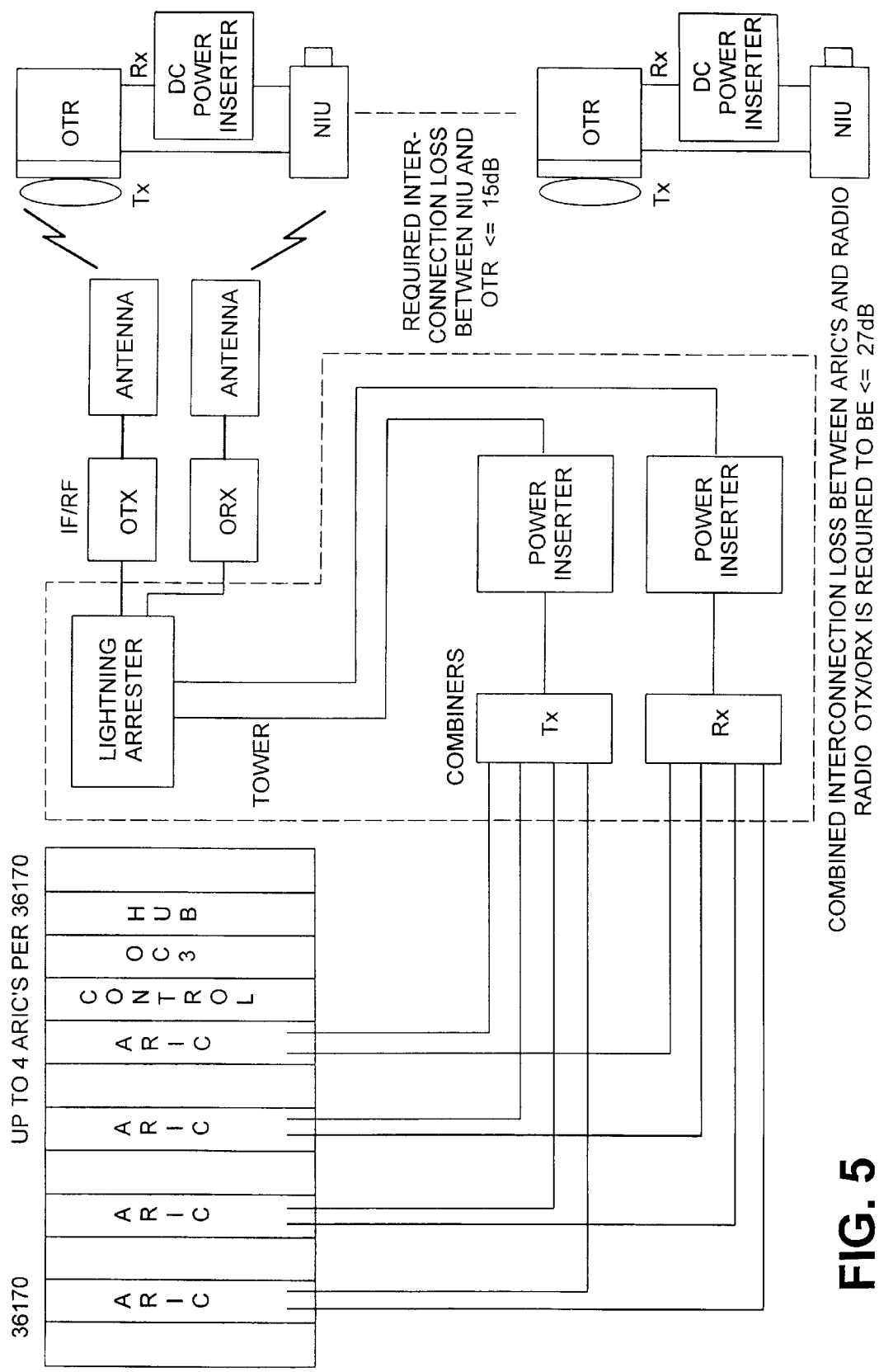
FIG. 5 shows a base station and network interface unit configuration.

Referring to FIGS. 4 and 5, the output/input from/to an ARIC is connected to a combiner/splitter that interfaces the appropriately shifted intermediate frequency (IF) signal to the transmitter and receiver modules. In this implementation an ARIC transmits on a single downstream frequency channel and receives on two upstream frequency channels. A NIU transmits on a single upstream frequency channel and receives on a single downstream frequency channel. Both the ARIC and NIU support a time division multiple access (TDMA) based Media Access Control (MAC) layer that allows a user to arrange the wireless link in a point to multipoint topology, where a single ARIC port is interconnected with a number of NIUs.

Ensuring the downlink power from an ARIC is always sufficient for reception by its associated NIUs requires downlink power control in accordance with the present invention.

Because the MAC on the NIU assumes that downlink power is always sufficient to ensure signal reception, it uses two uplink power control loops to regulate its uplink power such that the ARIC sees the entire uplink TDMA signal (an aggregate of signals from several NIU's) at a nominal power level. The first uplink power control is a short loop control, with a 100 millisecond, for example, integration interval, that tries to keep uplink power from the NIU, and seen at the base station, at a constant level as a function of the received downlink power level. This means that if an NIU sees downlink power decreasing, i.e power received by the NIU, it increases the uplink power level and vice versa. The second uplink power control is a long loop control, with a control interval substantially equal to the MAC polling rate (for example, two seconds), that sets the nominal transmit power level around which the short loop control is exercised. For the long loop control, the base station is continuously sampling the uplink power and then adjusts a NIU's transmit power level during a poll to bring it in line with other NIUs.

In such a system with three inter-related control loops i.e. closed loop; short loop; and long loop, and where two of the control loops have a predetermined sampling interval, the third sampling interval is preferably greater than, or equal to the larger of the two.

The following example considers this sampling interval relationship between the closed loop downlink control and the short and long uplink control conditions.

In this example the uplink short loop control may be represented as:

$$niu\_pout(n)=Pset(m)+niu\_pout(n-1)+correction1$$

where $correction1=niu\_pin(0)-niu\_pin(n)$.

The uplink long loop control may be represented as:

$$Pset(m)=Pset(m-1)+correction2$$

where $correction2=bts\_pin(0)-bts\_pin(m)$
$m=kn$; and
m and n are long and short loop sampling intervals respectively.

The downlink closed loop control may be represented as:

$$bts\_pout(j)=bts\_pout(j-1)+correction3$$

where $corrections=niu\_pin(0)-niu\_pin(j)$
$j=cm$; and
j is the closed loop sampling interval.

Figure 6A:
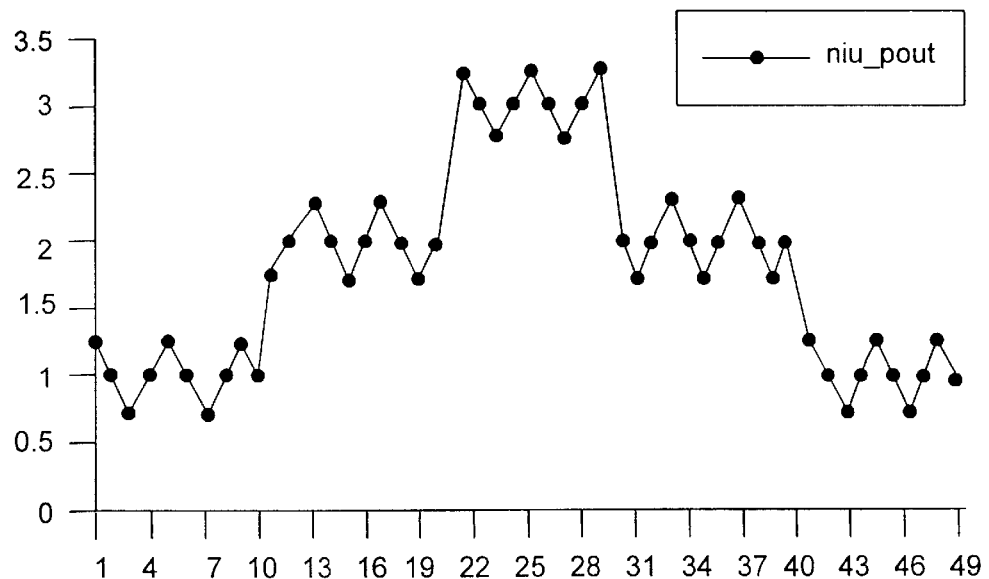
FIGS. 6A to 6C are graphs showing control loop sampling intervals.
Figure 6B:
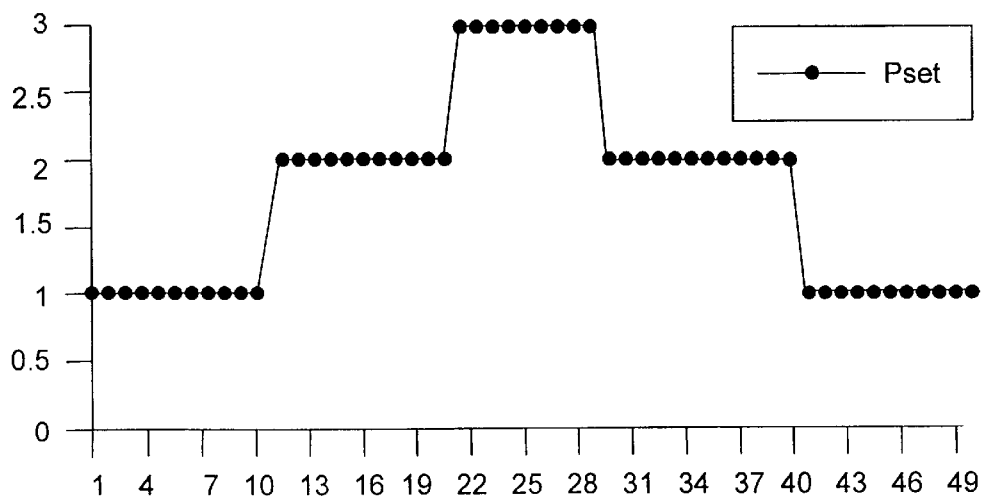
Figure 6C:
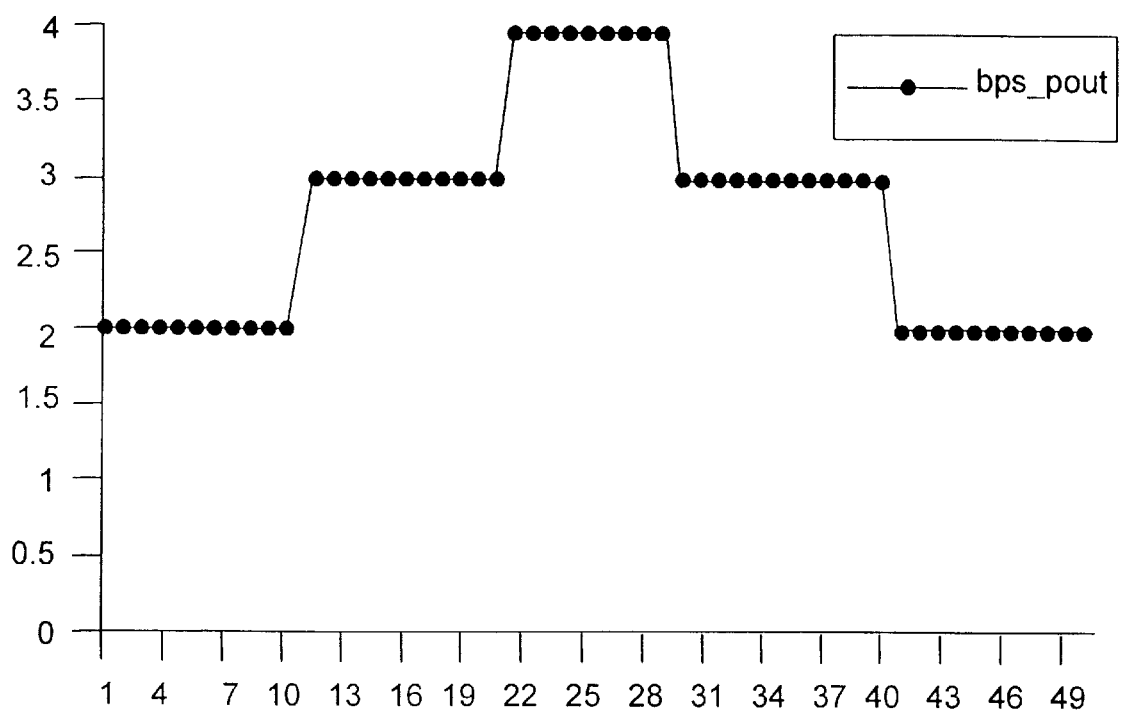

This choice of the sampling interval (j) for downlink closed loop control allows the uplink long loop control to mitigate any instabilities in uplink power caused by the short loop response to the downlink power change. Illustrations of this are shown in FIGS. 6A to 6C where the constants k and c=10 and 1 respectively.

In one embodiment of the invention an ARIC provides closed loop output power adjustment, involving a designated reference NIU. It is targeted to adjust for slow deep fades attributed to rain, for example, with typical transition duration ranging from 30 to 300 seconds. The closed loop correction on the downlink adjusts its mean output power level in response to receive power threshold crossing indications received from the reference NIU on the uplink. The change in mean output level is a power step for each threshold crossing. The total changed closed loop mean output power is the accumulation of the level changes.

This control algorithm is $$pout(n)=pout(n-1)+correction$$

where $correction=Pref-niu\_pin(n)$

To account for equipment limitations, output power range may be specified in terms of minimum and maximum transmission power and a quantized step. At the MAC level, the NIU sampled downlink power may be reported via a suitable message exchange, e.g. a status_request/status_response messaging sequence initiated by the ARIC MAC. This is controlled at the ARIC system level with another messaging sequence e.g. Gateway Status Request/Gateway Signal Status Response.

A request is sent to the reference NIU at the polling rate (for example 2 seconds), with the resulting data being made available for power adjustment calculations. The downlink power adjustment period is a multiple of the downlink power sample period. It is also set greater than both the NIU long and short loop power control periods, to minimize interaction with them. The following is performed each adjustment period.

1. Calculate the downlink average power.
2. Decide if the downlink average power has reached or exceeded the activity threshold.
3. If required, perform a power step within the predefined power output limits.

No power adjustment is done if the downlink average power is below the activity threshold. Power adjustment may also be disabled on the base station ARIC, for example, via a node management terminal interface (NMTI).

If communication is lost with the reference NIU, then the output power is ramped until either communication is re-established or the maximum configured transmit power (txmax), is reached. $pout(n)=min\ ((pout(n-1)+power\_step), txmax)$ In this event a port alarm will be generated to indicate loss of communication with the reference NIU.

The average power for the adjustment period is the sum of the power samples, divided by the number of power samples, rounded to the nearest dB.

$$niu\_pin(n)=int[(\Sigma pwr\_samp(i))/M]$$

where
$niu\_pin(n)$ is the average power for the adjustment period
$pwr\_samp(i)$ is a power sample
M in this example is the number of power samples in an adjustment period.

When power control is enabled, it uses a default manual power setting as the current output power. Once power control is enabled, activity will be initiated when the absolute difference between the NIU measured power and the user defined reference threshold is greater or equal to the activity threshold (Act_thres).
i.e.

$$\text{Abs}(\text{niu\_pin}(n)-\text{Pref}) >= \text{Act\_thres}$$

Activity will be terminated when the absolute difference between the NIU measured power and the user defined reference threshold is less than 2 dB, which is the minimum power step in this example.

$$\text{Abs}(\text{niu\_pin}(n)-\text{Pref}) < 2 \text{ dB}$$

When power control is disabled, it either power steps up or down to the default manual power setting. The reference NIU and its associated reference level can be determined, for example, from link budgets, as part of cell planning.

In a system without power control, the output power level from each ARIC is set to cause minimum interference with other sectors and cells. The policing mechanism to ensure this during power control is the user definable maximum and minimum output power. These levels can also be determined from link budgets, as part of cell planning.

The configurable parameters for downlink power control are listed below. All these items are kept in a database stored in non-volatile memory at the base station 1. Default Power
2. Reference NIU
3. Maximum power output
4. Minimum power output
5. Power step size
6. Reference power level
7. Power adjustment period
8. Activity threshold The following description, therefore, provides a description of the algorithm for controlling base station power to overcome rain fade, such that the power received by an NIU remains substantially constant. The power control algorithm takes into account the time variation of rain fade, and NIU power control on the uplink. When the base station enables downlink power control, the NIU power level statistics are reported to the base station using a messaging sequence such as a; Gateway Signal Status Response message. The base station may also enable threshold reporting which causes the NIU to report power level statistics when the power level reaches a specified threshold.

The base station will only provide a closed loop output power adjustment, involving a designated reference NIU and the base station. It is targeted to adjust for slow deep fades attributed to rain, where linear transition durations typically range from 30 to 300 seconds.

The closed loop correction on the downlink adjusts its mean output power level in response to receive power threshold crossing indications received from the reference NIU on the uplink. The change in mean output power level will be, for example, 2 dB nominal for each threshold crossing. The total changed closed loop mean output power will be the accumulation of the level changes.

The system model, without applying level quantization and power limiting, is:

$$\text{pout}(n)=\text{pout}(n-1)+\text{Pref}-r(n-1)\text{pout}(n-1)$$

where Pref−r(o)pout(0) is the steady state downlink power as seen by the NIU

This may be reduced to:

$$\text{pout}(n)=\text{pout}(n-1)+\text{correction}$$

where correction=Pref−niu_pin(n)

To account for equipment limitations, output power range is limited to txmin and txmax and a quantized step. Each parameter of the algorithm is controllable via a node management terminal interface (NMTI). These parameters are shown in Table 1.

TABLE 1

| Control Parameters | |
|---|---|
| Parameter | Default |
| Prime reference NIU | N/A |
| Secondary reference NIU | N/A |
| Maximum power output | 8 dBm |
| Minimum power output | −50 dBm |
| Power step size | 2 dB (in n*2dB steps) |
| Reference power level | −25 dBm (with 1 dB resolution between −10 and −40 dBm) |
| Power adjustment period | 2 s (in 1 s increments) |
| Power sample period | 1 s (in 1 s increments) |
| Activity threshold | 6 dB |

Figure 7A:
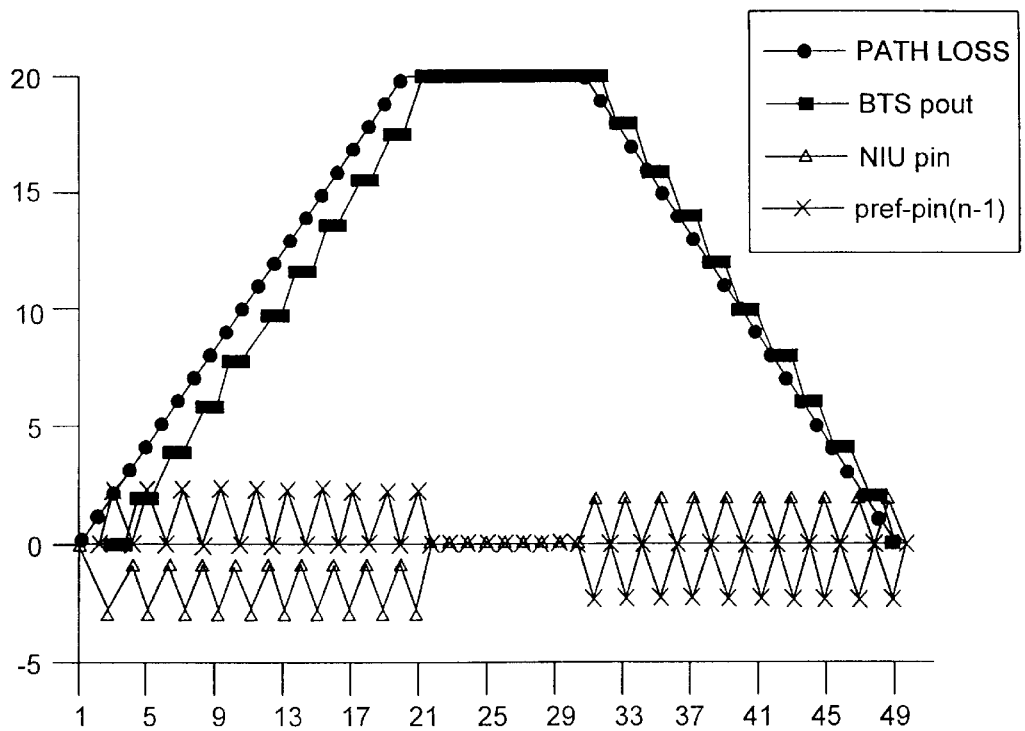
FIGS. 7A to 7C are graphs illustrating power control responses to rain fade scenarios.
Figure 7B:
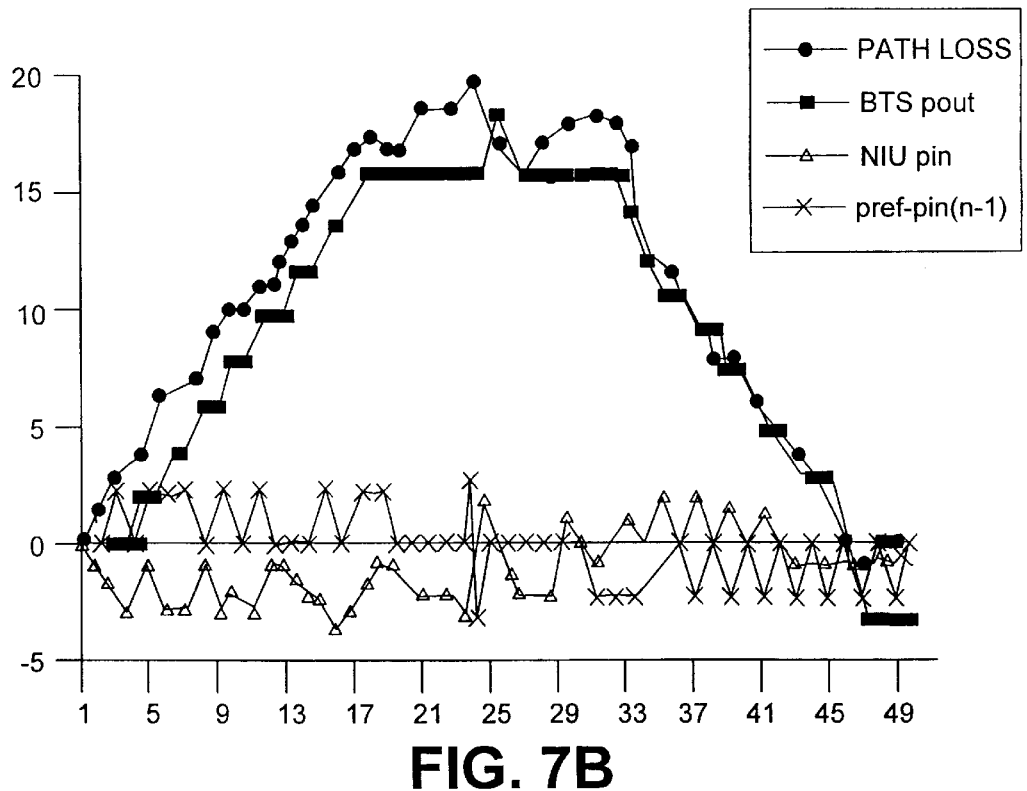
Figure 7C:
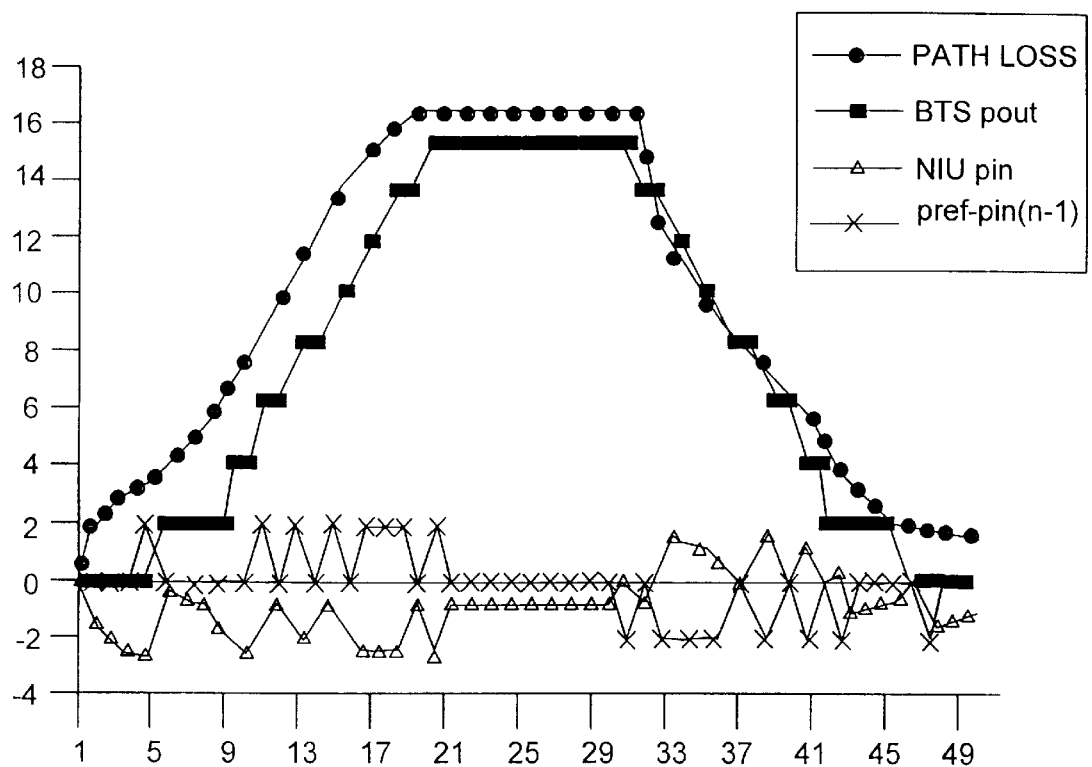

To demonstrate the power control functionality the following description relates to three rain fade scenarios that are simulated for power control, with a power step of 2 dB, no activity threshold, and no output power limiting. The first is a linear ramp shown in FIG. 7A. The second is a linear ramp, with random fluctuations in the range of {−1 dB, +1 dB} shown in FIG. 7B. The third is an exponential rise, shown in FIG. 7C. A cursory analysis shows that the downlink power level seen by the NIU will vary by 2 dB (quantization limited) in the best case and 4 dB in the worst case, during the transition stages of the rain fade.

An implementation example comprising a standard base station configuration for a single Newbridge 36170 shelf and multiple ARIC cards is illustrated in FIG. 5. It is to be understood, however, that many other configurations are possible. In FIG. 5 four ARIC cards are connected to a four port combiner and to a single radio and antenna pair servicing one sector. More than one 36170 shelf may be used in the same system with additional ARIC's connected through a larger multiport combiner for the same sector in the case of a densely populated area. This may be done for more than one sector depending on the requirements. Alternatively, all four ARIC's may be connected to their own radio and antenna pair without a combiner required so that one 36170 shelf may cover an entire cell assuming 90 degree sectors. For sparsely populated cells it may be desired to use a single ARIC card connected to four radio/antenna pairs with 90 degree sector antennas or to a different antenna for entire cell coverage with a single radio. In the present implementation up to 12 ARIC's may be transmitting and receiving from one radio corresponding to three fully populated 36170 shelves. Therefore, it is conceivable that a heavily populated area may have up to 12-36170 shelves at a single base node (this may be difficult due to the available bandwidth).

As discussed previously one implementation of a LMDS wireless system utilizes TDM on the downstream link from a multi service switch such as a Newbridge 36170 based ARIC card to the CPE's, and TDMA on the upstream links (there are two upstream channels for each downstream) accessible by multiple NIU's back to the ARIC.

The NIU link budgets are based on a −25 dBm nominal IF power with a power offset that will give an IF power input to the ARIC demodulator of −25 dBm. This offset is representative of the calibration offset passed to the NIU by the base station when it has entered the network. The intention for power calibration is to ensure that the power received at the demodulator for all NIUs is approximately equal (in this case −25 dBm) in order to prevent power step transients between time slots which could affect synchronization. The MAC layer on the ARIC modem card is responsible for power calibration so that the levels of −25 dBm Tx and Rx assume that these are the values used by the MAC. A receive midpoint between −10 to −40 dBm of −25 dBm is chosen in order to satisfy requirements for near and far NIUs. Ideally, the intermediate frequency (IF) power level should be as low as possible (−30 to −35 dBm) but this would require near distance NIU's to drop their power below the −40 dBm IF power specification. Similarly, if this nominal power is too high, the far distance NIUs would be required to raise their power above the −10 dBm specification during rain fade. Even for −25 dBm the NIU at 2500 m, for example, is required to transmit above specification during rain fade.

System offsets calibrate the receive power to exactly −25 dBm although in reality there will be a threshold around this point where power received can fluctuate before a correction will occur through calibration (for example 3dB, −22 to −28 dBm). This will prevent continuous corrections from occurring, which is a problem especially when calibrating a large number of NIUs.

In addition to the calibration process done during network entry and maintained through polling, the system uses, as previously discussed, an uplink short loop power control whereby the magnitude of the received power from the base station is used to adjust the NIU transmit power level. For this process, if the base station receive power decreases, the NIU transmit power increases and vice versa. Corrections from nominal are made through calibration done by polling. This means that if a base station power control algorithm is implemented, a rise in base station power output during rain fade may produce an undesired drop in NIU transmit power (along with the rain fade) for NIUs close to the base due to overcompensating for far NIUs. Calibration through polling occurs in order to correct the drop in NIU transmit power. Consequently, far NIUs which do not detect a drop in receive power will not increase their transmit using the closed loop power control, so calibration will also be required to correct for transmit power. This effect must be taken into account when using a base station power control algorithm. One way to minimize this is to use a base station power threshold of 6–8dB at the farthest (or weakest) NIU before a base station power adjustment is done. Also power adjustment is executed in small steps, such as 0.2–2.0 dB, and only once every 2 seconds, this will allow time for polling calibration to adjust the NIUs.

The results of the sample link budget indicates a maximum Rx IF power of −31.6 dBm (clear LOS, 650 m) and a minimum of −60.8 dBm (for rain fade at 45 deg at 2.5 km), both close to the above noted −30 to −60 dBm thresholds. The −5.0 dBm IF output at the base is a good nominal value offering good coverage and meeting power specifications in both weather conditions. However, in order to reduce cell interference it is possible to drop the power to −15.0 dBm in clear weather, and in the time of rain fade it could be increased to a maximum of 0 dBm and still meet the power specifications. This assumes that the rain fade is consistent over the cell distance which is often not the case. Rain fade is often variable over the cell coverage area which is not a problem for individual NIU power adjustment but, as will be apparent, a power adjustment at the base station will affect all the NIUs in the applicable cell or sector.

Power fades are effectively handled and adjusted in accordance with power data obtained from NIU polling. In this regard, NIUs are typically polled at least every 2 seconds. A NIU that is in the network is polled for its power status which includes the power level it is receiving from the base station and the power level it is transmitting to the base station (this is for NIU calibration). This information can be examined every 2 seconds (or more, or less) and depending on the power levels observed, the base station power level can be increased or decreased accordingly. The method of determining when to adjust power is dependent on several factors: i.e. the number of NIUs affected, the magnitude of the change, how quickly the change has occurred, and over what duration should the change be allowed before base station power is adjusted. Examples of factors described above include such things as: if only one (or a small number of) NIU is affected a power adjustment may not be done as quickly (if at all) as for the case in which a lot of NIUs are affected. If a large drop in power is recorded equally for all NIUs (a step input condition) this may be an alarm condition and a power adjustment may be done quickly (in large or small steps). Co-located pockets of NIUs may be affected by rain fade while others in the same cell are not. In this case the amount of base station power correction is limited in order to minimize saturation of the non-affected NIUs.

In the following description two methods for executing base station power control are provided.

In the first method the base station continuously tracks NIU receive (Rx) power with a 2 second sampling interval (approximately the same amount of time that all NIUs are polled) examining the strongest and weakest NIU Rx signals. The strongest Rx power value should be saved for each NIU as this will represent the clear LOS Rx power. The nominal base power should be adjusted such that the weakest NIU Rx power is set near the Rx power limit plus a cushion (for example −52 dBm). If this cannot be done without saturating the strongest NIU (Maximum receive plus an offset eg. −27dBm), an alarm condition should be raised and the next weakest NIU Rx power should be used as the benchmark. This could also depend on NIU power distribution such that if the majority all have a signal level close to the weakest with only a small number of strong signals the base station may then pick the next strongest NIU Rx signal as the maximum.

Once a nominal power is settled, the base station only changes power levels for Rx fluctuations of 6 dB that last more than 4 seconds, or if NIU(s) receive level is near threshold (−60 dBm, plus an offset eg. −58 dBm). Power adjustments occur in 1 db steps every 2 seconds so that a 6 dB corrections take 12 seconds. If the power drops or raises another 6 dB during this adjustment, the base station continues to adjust the power in the same manner. Power adjustments should be done slowly and small enough so that the power calibration done by the modem at the base station can negate the effect of the short loop power control at the NIU from increasing or decreasing the power by an amount that could cause Rx power to be out of range (−30 to −60 dBm) at the base station.

Ideally power adjustment should only be done at the end or beginning of a signal frame. Nevertheless, transients may occur on the downlink signal which can cause loss of synchronization especially for large power steps. Power control will typically be very dependent on the Rx power for all NIUs as well as the power distribution. NIUs which all have approximately the same Rx power in clear conditions are ideal, however if many NIUs are widely variant in receive power (near threshold −30 to −60 at the base), this will be problematic during rain fade power control.

The numbers used above for power variance and time threshold can be adjusted to match the requirements at the base station. It may also be possible for the base station to automatically determine these levels depending on the signal strengths from the NIUs and the power distribution. It may be more effective to use a 3 dB threshold and adjustment criteria especially for wide NIU Rx power variances.

Figure 8:
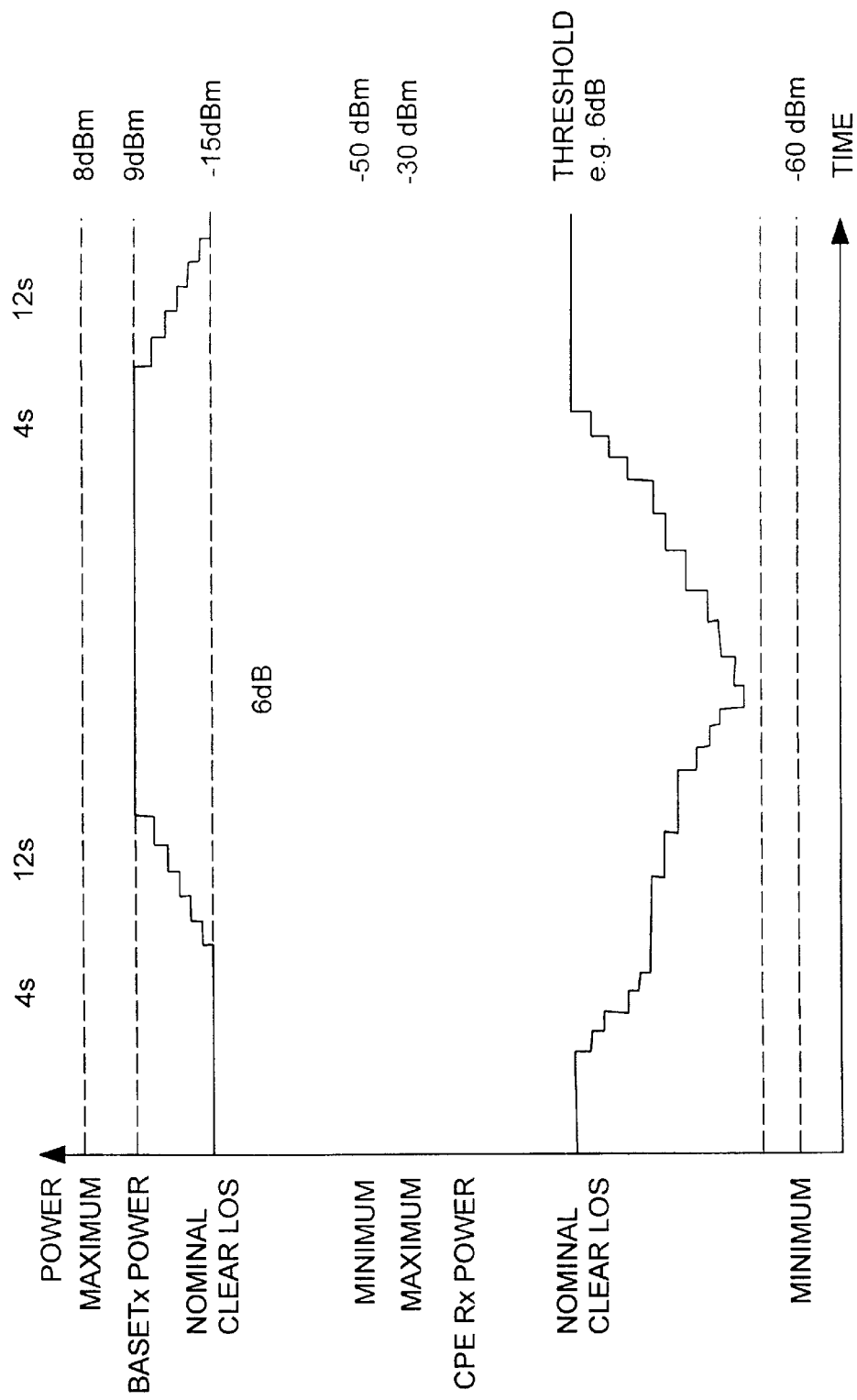
FIG. 8 contains graphs of BTS power control according to one embodiment of the invention.

FIG. 8 shows a temporal representation for base station power control based on NIU receive power. It assumes that the rain fade transition is a linear process, with a minimum duration of 30 seconds and a maximum duration of 300 seconds. The nominal NIU receive power is obtained via the MAC polling process in which the MAC layer in the ARIC polls a designated reference CPE for status information once every two seconds or less. In this example the receive power threshold is 6 dB, the threshold time response is 4 seconds, and power adjustment occurs in 1 dB steps every 2 seconds. The configured maximum base station output power for this example is −9 dBm.

In the second method for base station power control it is assumed that the nominal base station power has been set, and that no rain fade exists when base station power control is enabled. The base station continuously samples the reference NIU Rx power every 2 seconds (using the Gateway Status Request message). Once a nominal power is settled, the base station only changes power levels for receive fluctuations of 6 dB that last more than 4 seconds, or if NIU(s) receive level is near threshold (−60 dBm, plus an offset eg. −58 dBm). As described in relation to the first method power adjustments occur in 1db steps every 2 seconds, therefore as in the previous example, 6dB corrections take 12 seconds. If the power drops or raises another 6 dB during this adjustment, the base station continues to adjust the power in the same manner. Power adjustments should be done slowly and small enough so that the power calibration done by the ARIC modem in the base station can negate the effect of the short loop power control at the NIU from increasing or decreasing the power by an amount that could cause Rx power to be out of range (30 to −60 dBm) at the base.

Ideally power adjustment should only be done at the end or beginning of a signal frame. Nevertheless, transients may occur on the downstream power which may cause loss of synchronization especially for large power steps. Power control will be very dependent on the Rx power for all NIUs and the power distribution, NIUs which all have approximately the same Rx power in clear conditions are ideal, however if many NIUs are widely variant in receive power (near threshold −30 to −60 at the base station), this will be problematic during rain fade power control.

The numbers used above for power variance and time threshold could be adjusted to match the requirements at the base station. It may also be possible for the base station to automatically determine these levels depending on the signal strengths of the NlUs and power distribution. It may be more effective to use a 3 dB threshold and adjustment especially for wide NIU Rx power variances.

Base station power loss can be handled by several methods. Design link budgets with excess loss margins, divide the sector into distance regions thereby dividing NIUs into groups where Rx power variance is minimized, adjust base station power to compensate for loss in real time, or use a combination of all these methods.

The simplest method is to use excess link margin, however if cell sizes are large there may not be enough power range to cover losses at far distance NIUs without saturating the near NIUs. Non-consistent rain fade increases this possibility.

Dividing the sector into regions by distance increases the amount of excess link margin since near and far NIUs in a region are closer in Rx power.

Base station power control uses an algorithm whereby power is minimized in clear LOS conditions, and is increased to compensate for fade conditions. This also minimizes inter-cell interference.

Although particular embodiments of the invention have been disclosed and illustrated it will be apparent to one skilled in the art that numerous alternatives and variations to the basic concept can be implemented. It is to be understood, however, that such alternatives and variations will fall within the scope of the invention as defined by the appended claims.

GLOSSARY

ARIC ATM Radio Interface Card- a Newbridge 36170 card that carries data formatted in ATM cells and interfaces to external radio equipment.

ATM Asynchronous Transfer Mode. A switching/transmission technology which employs 53 byte cells as a basic unit of transfer. The ATM Cell is divided into 5 bytes of ATM Layer overhead and 48 bytes of ATM payload. ATM is fundamentally statistical in nature, with many "virtual circuits" sharing bandwidth.

BTS Base Transceiver Station. In this context, the BTS is a 36170 which contains ARIC cards.

IF intermediate Frequency

MAC Media Access Control

NIU Network Interface Unit. Part of the Subscriber Unit that sits inside the building, contains radio modems (but not the RF parts) interfaces to the subscriber equipment (ethernet, ATM25, OC3c, T1/E1, video, depending on the NIU model), and all the software to interface the subscriber signal to the ATM world.

NMTI Node Management Terminal Interface. The local user interface for a Newbridge network element.

OAM Operations, Administration and Management

QPSK Quaternary Phase Shift Keying

RF Radio Frequency

TDMA Time Division Multiple Access

What is claimed is:

1. In a broadband wireless system having a base station for communicating with a set of network interface units (NIUs) over a wireless link, a system for compensating for time variable path attenuation of the link comprising: means for designating a reference NIU from the set of NIUs; polling means at the base station to periodically obtain status information from the designated reference NIU; and control means at the base station to adjust transmission power of the base station to the set of NIUs in accordance with the status information obtained from the reference NIU to compensate for time variable path attenuation of the link.

2. A system as defined in claim 1 wherein said broadband wireless system is a local multipoint delivery system (LMDS) operating at millimeter wave frequencies.

3. A system as defined in claim 2 wherein each of said NIUs is adapted to receive communication from said base station in a point to multipoint format and to transmit communication to said base station in a point to point form.

4. A system as defined in claim 3 wherein a plurality of radio frequency (RF) carriers are used to transmit digital communication between said base station and said network interface units.

5. A system as defined in claim 4 wherein a plurality of said network interface units are located within a sector of a cell each communicating with a base station at one of said RF carriers.

6. A system as defined in claim 1 wherein the NIU which is the furthest from the base station is designated as the reference NIU.

7. A system as defined in claim 1 wherein said polling means requests status information from said reference NIU via a downlink signal on a downlink path and receives status information from said reference NIU over an uplink path.

8. A system as defined in claim 7 wherein a dynamic transmission power level on said downlink path is used by said reference NIU to provide the status information.

9. A system as defined in claim 8 wherein uplink transmission from said reference NIU to said base station is adjusted in accordance with first and second adjustment periods.

10. A system as defined in claim 9 wherein said first adjustment period is shorter than said second adjustment period and said second adjustment period is similar to the periodic polling period.

11. A system as defined in claim 7 wherein a signal to noise value associated with said downlink signal is used to provide the status information.

12. A system as defined in claim 7 wherein said status information is based on a bit error rate (BER) of said downlink signal.

13. A system as defined in claim 1 wherein each NIU in said set of NIUs is located within a cell and said reference NIU is an NIU in said set of NIUs located closest to the edge of said cell.

14. A system as defined in claim 1 wherein said reference NIU is an NIU in said set of NIUs known from previously obtained information to be the NIU in said set of NIUs most likely to experience time variable path attenuation.

15. A method of controlling the power level of transmission from a base station to a set of network interface units (NIUs) over a wireless link in a cellular, broadband wireless communication system in order to compensate for time dependent path attenuation, the method comprising: designating a reference NIU from said set of NIUs; periodically polling the designated reference NIU for status information; and adjusting transmission power of said base station to the set of NIUs in accordance with said status information from said reference NIU to compensate for time dependent path attenuation.

16. A method as defined in claim 15 wherein said designated NIU is the NIU which is the furthest away from the base station.

17. A method as defined in claim 15 wherein a closed loop downlink power control is used to adjust base station transmission power.

18. A method as defined in claim 17 further including both a short loop and a long loop uplink power control to adjust base station power transmission.

19. A method as defined in claim 18 wherein the sampling interval of said short loop uplink power control is shorter than the sampling interval of long loop uplink power control.

20. A method as defined in claim 19 wherein the power adjustment interval at said base station is greater than the sampling interval of said long loop uplink power control.

21. A method as defined in claim 15 wherein each NIU in said set of NIUs is located within a cell and said reference NIU is an NIU in said set of NIUs located closest to the edge of said cell.

22. A method as defined in claim 15 further comprising designating as the reference NIU the NIU in said set of NIUs known from previously obtained information to be the NIU in said set of NIUs most likely to experience time variable path attenuation.

* * * * *